US012792728B2

(12) United States Patent
Mallur

(10) Patent No.: US 12,792,728 B2
(45) Date of Patent: Nov. 10, 2026

(54) DYNAMIC PREDICTION OF OPERATIONS TECHNOLOGY CYBERSECURITY RISK AND DETERMINATION OF OPTIMAL MITIGATING CONTROL USING BAYESIAN-INFERENCE-BASED MACHINE LEARNING AND ANALYTICAL HIERARCHY PROCESS

(71) Applicant: Saudi Arabian Oil Company, Dhahran (SA)

(72) Inventor: Srinidhi Mallur, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 114 days.

(21) Appl. No.: 19/013,051

(22) Filed: Jan. 8, 2025

(65) Prior Publication Data

US 2026/0195445 A1 Jul. 9, 2026

(51) Int. Cl.
*G06F 21/55* (2013.01)
*G06F 21/57* (2013.01)

(52) U.S. Cl.
CPC .......... *G06F 21/552* (2013.01); *G06F 21/577* (2013.01); *G06F 2221/034* (2013.01)

(58) Field of Classification Search
CPC . G06F 21/552; G06F 21/577; G06F 2221/034
See application file for complete search history.

(56) References Cited

U.S. PATENT DOCUMENTS

| | | | | |
|---|---|---|---|---|
| 8,468,244 | B2 | 6/2013 | Redlich et al. | |
| 9,129,110 | B1 * | 9/2015 | Mason | G06F 21/562 |
| 10,019,892 | B1 * | 7/2018 | Wang | G06Q 10/04 |
| 10,560,468 | B2 | 2/2020 | Muddu et al. | |
| 11,184,401 | B2 | 11/2021 | Crabtree et al. | |
| 2007/0033060 | A1 * | 2/2007 | Gopalan | G06Q 10/067 705/348 |
| 2009/0077666 | A1 * | 3/2009 | Chen | G06Q 10/0631 726/25 |

(Continued)

FOREIGN PATENT DOCUMENTS

| | | | |
|---|---|---|---|
| CN | 104112181 | A * | 10/2014 |
| CN | 106576052 | B | 9/2020 |

(Continued)

OTHER PUBLICATIONS

International Search Report and Written Opinion in Intl. Appln. No. PCT/US2026/010426, mailed on May 6, 2026, 11 pages.

(Continued)

*Primary Examiner* — John B King
(74) *Attorney, Agent, or Firm* — Fish & Richardson P.C.

(57) ABSTRACT

A computer-implemented method includes continuously receiving, by a Risk Prediction and Control Determination System (RPCDS), threat intelligence data. The threat intelligence data is processed using a Bayesian Inference Engine of the RPCDS. Risks associated with the threat intelligence data are determined, as determined risks, by the Bayesian Inference Engine of the RPCDS. The determined risk is processed by an Analytical Hierarchy Process (AHP) of the RPCDS. Optimal cybersecurity controls are selected by the AHP of the RPCDS based on assigned priorities.

20 Claims, 9 Drawing Sheets

(56) References Cited

U.S. PATENT DOCUMENTS

| | | | | |
|---|---|---|---|---|
| 2009/0327186 | A1* | 12/2009 | Vivalda | G06Q 10/06 706/46 |
| 2012/0005115 | A1* | 1/2012 | Hofberg | G06Q 10/067 705/348 |
| 2018/0032736 | A1 | 2/2018 | Inagaki et al. | |
| 2019/0268366 | A1 | 8/2019 | Zeng et al. | |
| 2021/0374251 | A1* | 12/2021 | Tineo | G06F 9/445 |
| 2023/0140645 | A1* | 5/2023 | Gauthier | G06F 21/53 726/23 |
| 2023/0229785 | A1* | 7/2023 | Jurado | G06F 3/0483 726/25 |
| 2024/0073242 | A1 | 2/2024 | Fellows et al. | |
| 2024/0418795 | A1* | 12/2024 | Zhu | G01R 31/3842 |
| 2025/0358296 | A1* | 11/2025 | Ray | H04L 63/1416 |
| 2026/0009880 | A1* | 1/2026 | Valles | G01S 7/021 |
| 2026/0099433 | A1* | 4/2026 | Romero-Mariona | G06F 11/0793 |
| 2026/0141080 | A1* | 5/2026 | Jurado | G06F 21/577 |

FOREIGN PATENT DOCUMENTS

| | | | | |
|---|---|---|---|---|
| CN | 116610469 | A * | 8/2023 | G06F 11/008 |
| WO | WO 2021/138299 | A1 | 7/2021 | |

OTHER PUBLICATIONS

Panahnejad et al., "APT-Dt-KC: advanced persistent threat detection based on kill-chain model," The Journal of Supercomputing, 2022, 78:8644-8677.

* cited by examiner

800

DYNAMIC PREDICTION OF OPERATIONS TECHNOLOGY CYBERSECURITY RISK AND DETERMINATION OF OPTIMAL MITIGATING CONTROL USING BAYESIAN-INFERENCE-BASED MACHINE LEARNING AND ANALYTICAL HIERARCHY PROCESS

BACKGROUND

Risk prediction and mitigation processes are extremely important in operations technology cybersecurity, and many approaches exist to perform related functions related to risk prediction and mitigation processes. Bayesian inference (BI) is standard statistical algorithm used to predict probabilities using a priori information, and an analytical hierarchy process (AHP) is a standard decision making framework. A seamless integration of BI-based machine learning (ML) and AHP is possible to fundamentally transform the landscape of risk prediction and mitigation in operations cybersecurity.

SUMMARY

The present disclosure describes dynamic prediction of operations technology cybersecurity risk and determination of optimal mitigating control using Bayesian-inference-based machine learning and analytical hierarchy process.

In an implementation, a computer-implemented method, comprises: continuously receiving, by a Risk Prediction and Control Determination System (RPCDS), threat intelligence data; processing, by a Bayesian Inference Engine of the RPCDS, the threat intelligence data; determining, by the Bayesian Inference Engine of the RPCDS as determined risks, risks associated with the threat intelligence data; processing, by an Analytical Hierarchy Process (AHP) of the RPCDS, the determined risks; and selecting, by the AHP of the RPCDS, optimal cybersecurity controls based on assigned priorities.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the described approach uses multiple risk attributes to predict severity. The approach is extensible and additional attributes can be added to improve prediction functionality. This is an improvement over existing technologies which reply on one attribute. Second, the described approach takes a holistic view of risk and can incorporate every attribute that an entity decides to use to identify risk. Third, the described approach proposes a specific machine learning algorithm and methodology to predict risk. System implementation simply needs to codify the algorithm. Fourth, the algorithm is specific in the sense that accuracy continuously improves with new learnings. Fifth, an analytical hierarchy process (AHP) does not exist in current technology. Inclusion of this AHP ensures that risk response is optimized to an entity's strategic objectives. Sixth, the AHP process is based on a collective codification of an entity's subject matter experts and highly contextualized to the entity.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes dynamic prediction of operations technology cybersecurity risk and determination of optimal mitigating control using Bayesian-inference-based machine learning (ML) and Analytical Hierarchy Process (AHP) and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

A described approach revolves around seamless integration of Bayesian Inference and AHP, fundamentally transforming the landscape of risk prediction and mitigation. Efficient combination of these two algorithms, offer a novel approach to prioritize cybersecurity attributes, predict risks, and dynamically select and implement optimal controls.

The described approach includes:

1. Incorporation of Bayesian Inference into a cybersecurity risk prediction process. Bayesian Inference, known for its adaptability and learning capabilities, is employed to dynamically assess evolving threats. The application of Bayesian Inference in the context of real-time cybersecurity risk prediction allows for refinement of predictions based on incoming data.
2. The application of AHP to assign priority values to diverse cybersecurity attributes, facilitating a structured hierarchy of criteria and sub-criteria and allowing stakeholders to conduct pairwise comparisons and to generate prioritization. By leveraging AHP in the approach, the described approach is an improved method for systematically assigning priority values to cybersecurity attributes, forming a solid foundation for decision making.
3. Integrating the algorithms into a comprehensive risk prediction and mitigation process involves continuous data collection, AHP-driven priority assignment, Bayesian risk prediction, and automated control selection based on an established AHP decision-making matrix. The approach's ability to seamlessly transition from risk prediction to automated control implementation is a central aspect of the approach, asserting a holistic and adaptive cybersecurity solution.

Figure 1:
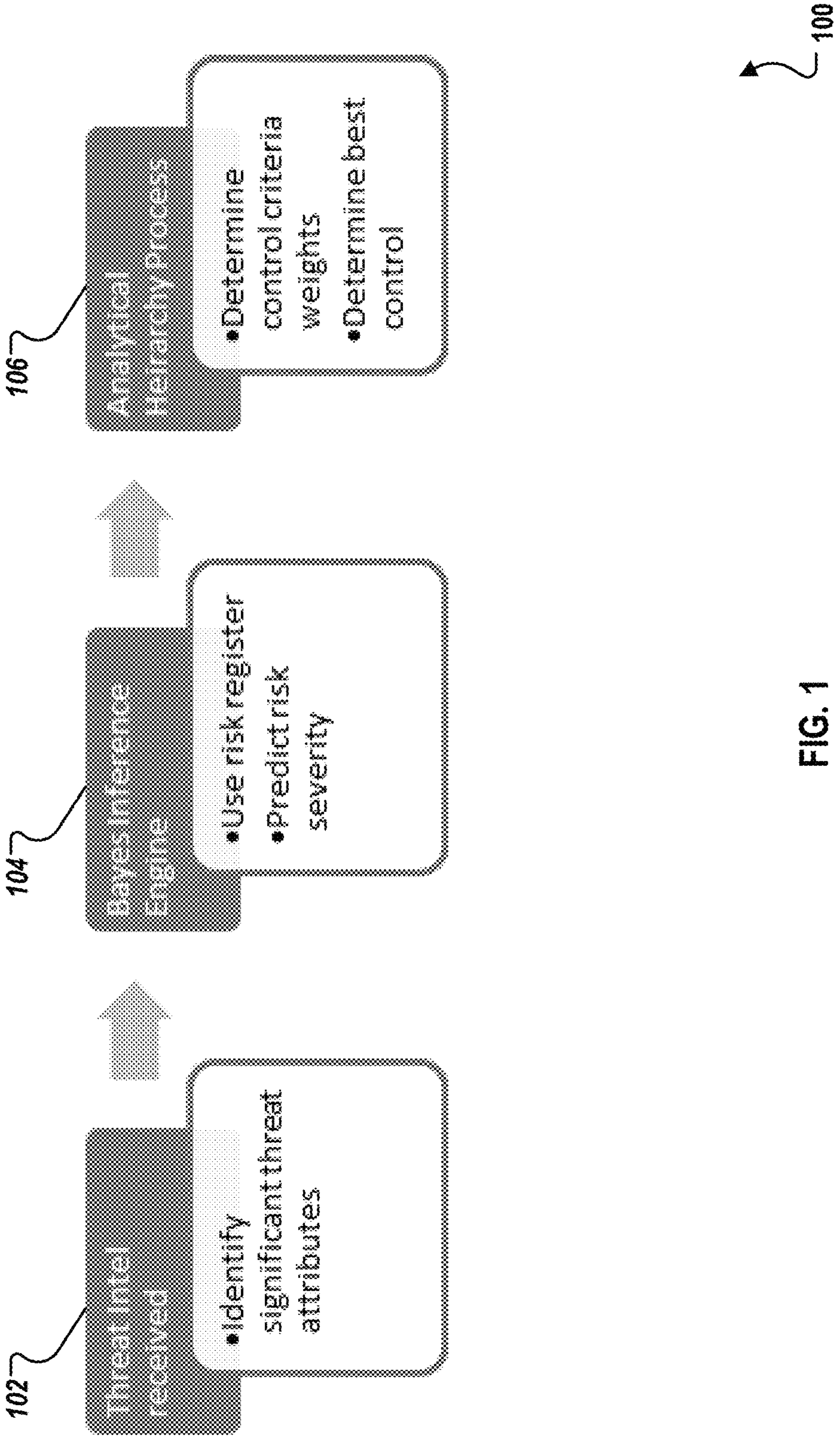
FIG. 1 is a block diagram illustrating an example of an overall flow for dynamic prediction of operations technology cybersecurity risk and determination of optimal mitigating control using Bayesian-inference-based machine learning (ML) and analytical hierarchy process (AHP), according to an implementation of the present disclosure.

FIG. 1 is a block diagram illustrating an example of an overall flow 100 for dynamic prediction of operations technology cybersecurity risk and determination of optimal mitigating control using Bayesian-inference-based ML and AHP, according to an implementation of the present disclosure. As illustrated in FIG. 1, and at a high-level, the overall flow 100 includes: 1) receiving threat intelligence 102 (e.g., a) identify significant threat attributes); 2) use of a Bayesian Inference Engine 104 (e.g., a) use a risk register and b) predicting risk severity); and 3) use of an AHP 106 (e.g., 1a) determining control criterial weights and b) determining a best control).

Figure 2:
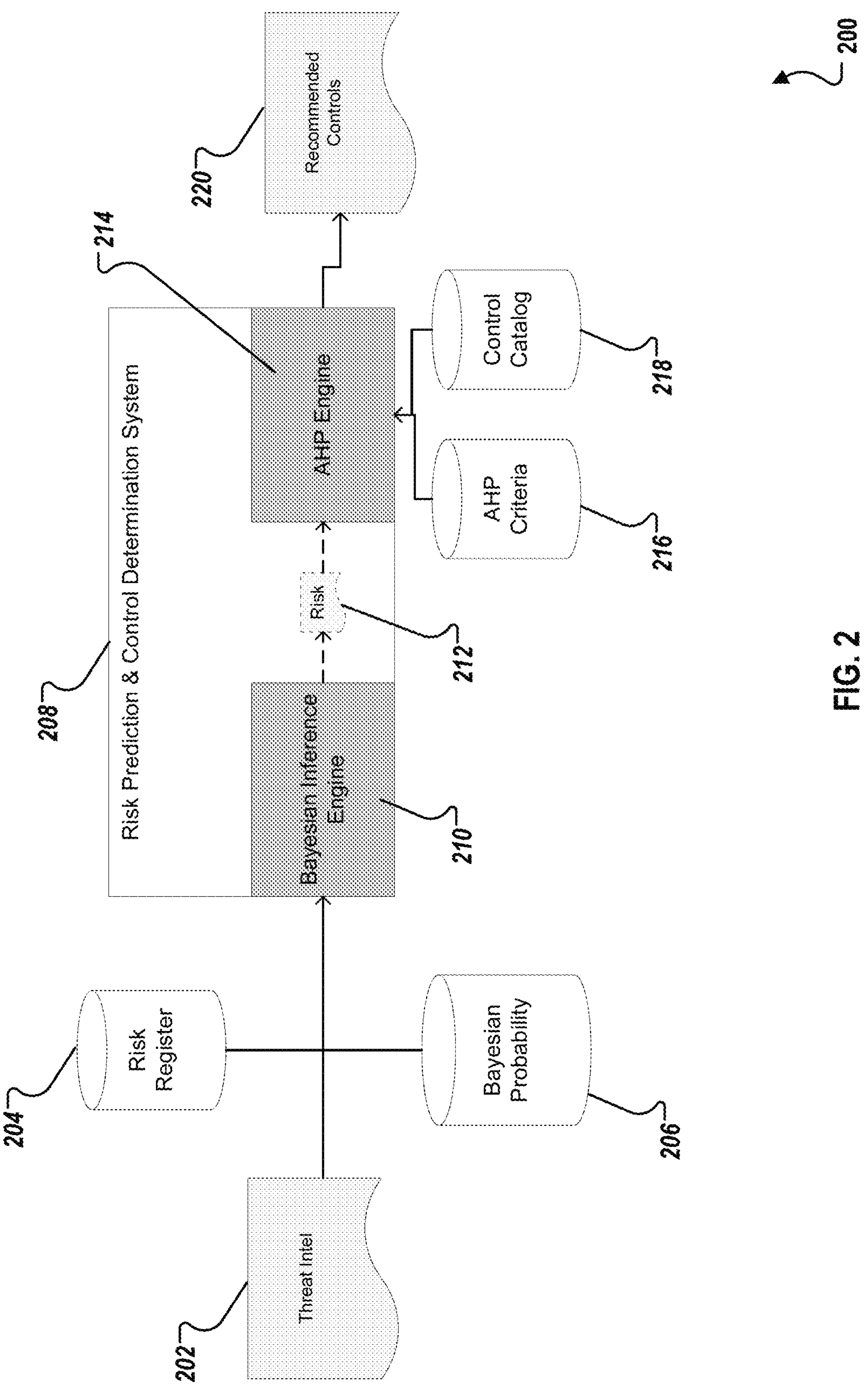
FIG. 2 is a block diagram illustrating an example appliance 200 for dynamic prediction of operations technology cybersecurity risk and determination of optimal mitigating control using Bayesian-inference-based ML and AHP, according to an implementation of the present disclosure.

FIG. 2 is a block diagram illustrating an example appliance 200 for dynamic prediction of operations technology cybersecurity risk and determination of optimal mitigating control using Bayesian-inference-based ML and AHP, according to an implementation of the present disclosure.

The described approach to cybersecurity risk management is built on a synergistic integration of the AHP and Bayesian Inference, creating a robust system for predicting and mitigating cybersecurity risks. The detailed approach encompasses the application of these algorithms in a cohesive manner to address the challenges associated with dynamic and evolving cyber threats.

With respect to Bayesian Inference for Risk Prediction, the objective is employed to predict cybersecurity risks based on incoming data. Bayesian Inference combines prior knowledge with new evidence to continuously update predictions. In the context of cybersecurity, it adapts to evolving threats by dynamically adjusting beliefs about a likelihood of specific risks. The integration of Bayesian Inference into the described approach ensures a proactive and adaptive approach to risk prediction. The algorithm provides a real-time assessment of potential threats, enhancing the system's ability to respond swiftly to emerging risks.

With respect to AHP, AHP is applied to assign priority values to various cybersecurity attributes. A structured hierarchy of criteria and sub-criteria relevant to cybersecurity is created. Stakeholders then engage in pairwise comparisons to establish the relative importance of these factors. The AHP algorithm processes this information, generating priority values for each attribute. The prioritization becomes the cornerstone of the risk assessment process, offering a systematic and quantifiable approach to understanding the significance of different cybersecurity elements and recommending an optimal mitigation.

With respect to an integrated risk prediction and mitigation process, continuous monitoring collects real-time data on threat events and prioritizes and selects the significant threat. Bayesian Inference processes incoming data, updating and refining predictions on potential cybersecurity risks and its severity. AHP is employed to assign priority values to the cybersecurity attributes based on their significance in the context of the organization's cybersecurity goals. An established AHP decision-making matrix guides the selection of optimal cybersecurity controls based on assigned priorities. In an event of a detected threat, the described approach triggers automated responses, implementing the selected cybersecurity controls to mitigate risks swiftly.

The described approach is designed as an adaptive security framework that seamlessly transitions from risk prediction to automated mitigation. The combination of AHP and Bayesian Inference ensures that the approach not only identifies risks but also dynamically adjusts its responses to changing threat landscapes. Moreover, the Bayesian process speeds up a risk assessment process by using ML and reduces reliance on hard to find cybersecurity experts. Risk prediction becomes near instantaneous as soon as relevant variable values are identified. Since AHP inherently relies on subject matter experts for pairwise comparison, expert knowledge is embedded. By aligning technical and management concerns, AHP implicitly enables analysis related to use of resources (e.g., business cases and/or technical cases).

In FIG. 2, threat intelligence 202 is gathered continuously. A Risk Register 204 (e.g., a database) can contain data for risks associated with particular Threat Intelligence 202 and be updated by the described approach to add, delete, or modify risks. Bayesian Probability 206 (e.g., a database) can contain probability data with respect to particular Threat Intelligence 202 and be updated by the described approach to add, delete, or modify probabilities stored in the Bayesian probability 206.

A Risk Prediction & Control Determination System 208 includes a Bayesian Inference Engine 210, Risk 212, and an AHP Engine 214. As previously described, the Bayesian Inference Engine 210 processes incoming data (e.g., Threat Intelligence 202), updating and refining predictions on potential cybersecurity risks and associated severity. Risks 212 determined by the Bayesian Inference Engine 210 are processed by the AHP Engine 214 to assign priority values to the cybersecurity attributes based on their significance in the context of an entity's cybersecurity goals. AHP Criteria 216 and a Control Catalog 218 can be used by the AHP Engine 214 to assign the described priority values to the cybersecurity attributes. For example, an established AHP decision-making matrix can guide a selection of optimal cybersecurity controls at 220 based on assigned priorities.

Bayesian Engine (Inference for Risk Prediction).

Figure 3:
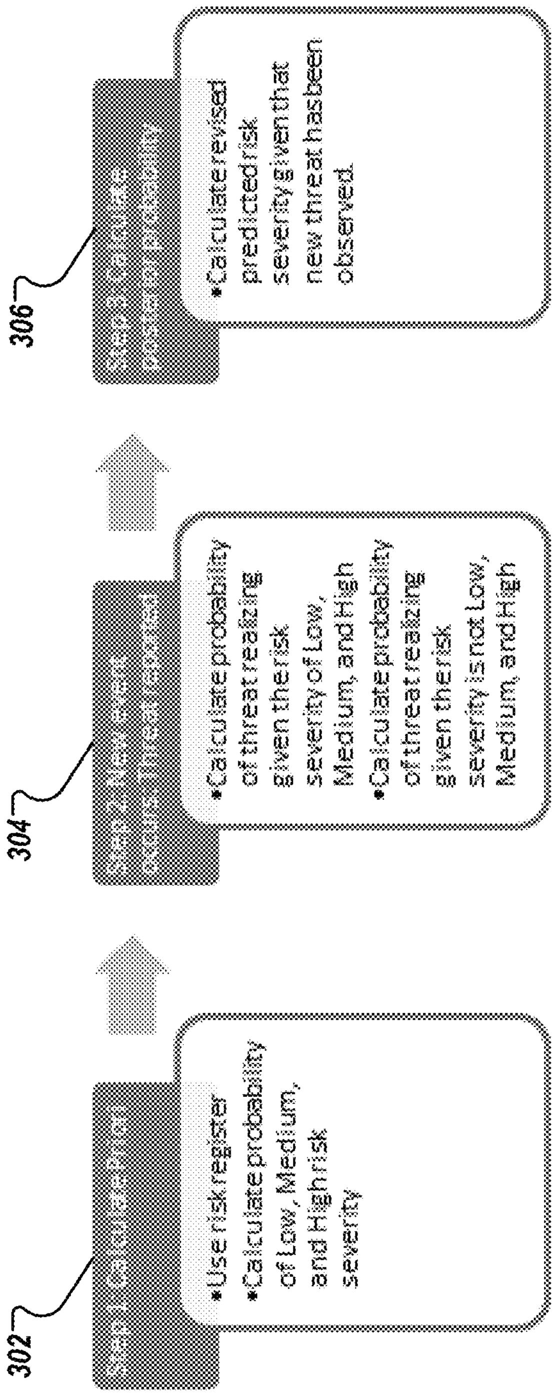
FIG. 3 is a block diagram illustrating an example of a process flow for applying Bayesian ML Inference in the appliance of FIG. 2, according to an implementation of the present disclosure.

FIG. 3 is a block diagram illustrating an example of a process flow 300 for applying Bayesian ML Inference in the appliance 200 of FIG. 2, according to an implementation of the present disclosure. As illustrated in FIG. 3, process flow 300 includes: 1) Step 1: Calculate Priori 302 (e.g., a) using a risk register and b) calculate probability of low, medium, and high risk severity); 2) Step 2: New event occurs: Threat reported 304 (e.g., a) probability of threat is calculated realizing given the risk severity of low, medium, and high and b) probably of threat is calculated realizing given the risk severity if not low, medium, and high); and 3) Step 3: Calculate posterior probability (e.g., a) calculate revised predicted risk severity given that new threat has been observed).

The Bayesian Formula is:

$$P(A|B)=(P(B|A)*P(A))/P(B), \tag{1}$$

where:

- P(A|B) is the probability of event A occurring given that event B has occurred,
- P(B|A) is the probability of event B occurring given that event A has occurred,
- P(A) is the prior probability of event A occurring, and
- P(B) is the prior probability of event B occurring.

Applying Bayesian Formula to OT Cybersecurity Risk Prediction.

Before applying the Bayesian ML, the following design must be implemented (i.e., a one-time setup to configure the example appliance 200 in FIG. 2) for ML to work.

Risk Attributes.

For the purpose of this disclosure, assume that the following attributes define a risk (note that all attributes and values have been shown for illustration purposes to keep calculation and explanation manageable).

- Risk Rating (R)={High (H), Medium (M), Low (L)}.
- Threat Vector (V)={Threat Event, Actor, Intent, Origin, Privilege Level, Skill, Capability}, where:
- Threat Event={Network DoS, Wrongful System Use, Non-authorized code execution, Destructive Malware}.
- Actor={Nation-State, Vendor, Employee, Hacker}.
- Intent={Malicious, Accidental}.
- Origin={Internal, External}.
- Privilege={Unprivileged, Significant privilege}.
- Skill={Adept, Operational, None}.
- Capability={High, Medium, Low}, where a dataset for all threat vectors in our threat catalog V={v1, . . . vn}.
- System(S)={Emergency Shutdown System (ESD), Distributed Control System (DCS), Vibration Monitoring System (VMS), Turbine Control System (TCS)}.
- Incident (I)={Yes (Y), No (N): Any incident registered on the system?
- Compliance (C)=(Yes (Y), No (N)}: Is the system compliant with current controls?
- Control Effectiveness (E)={Yes (Y), No (N)}: Are the current controls effective?

Risk Definition.

It is assumed that a dataset for all risks exists in a risk register D=($X_1$, . . . $X_n$) and, for simplicity (although not limiting), each risk has attributes (from above) (e.g., $X_n$={V, S, I, C, E, R}).

Figure 4:
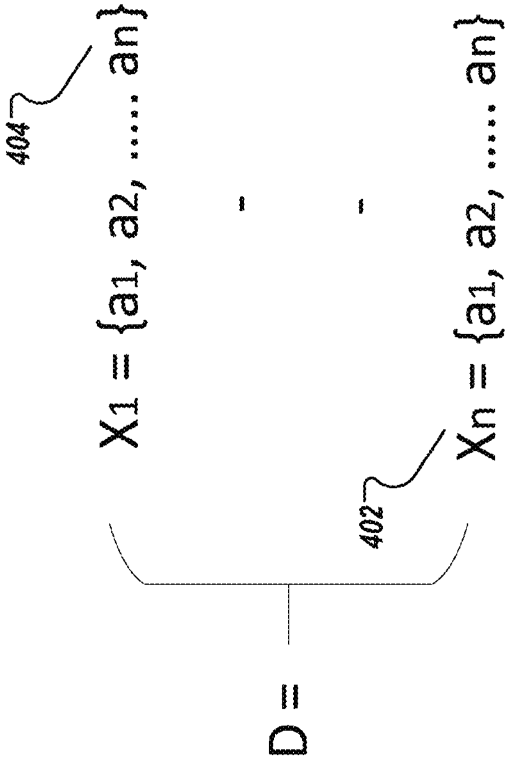
FIG. 4 illustrates an example risk register D, according to an implementation of the present disclosure.

Turning to FIG. 4, FIG. 4 illustrates an example risk register D 400, according to an implementation of the present disclosure. In FIG. 4, the risk register D 400 can be generalized as illustrated, where $X_n$ 402 is a risk and an 404 denotes attributes:

$$\{V,S,I,C,E,R\}, \tag{2}$$

as previously described.

Directed Acyclic Graph (DAG).

Returning to FIG. 3, a causal relationship between risk and risk attributes can be visually represented using a DAG. A visual representation is easier to understand and lets the modeler ensure mutual exclusivity of attributes. Further, the DAG helps with calculating joint probabilities. In some implementations, a DAG is commonly used to create program evaluation and review technique (PERT) charts, link MICROSOFT EXCEL cells (e.g., change one to change linked cells), etc.

Figure 5:
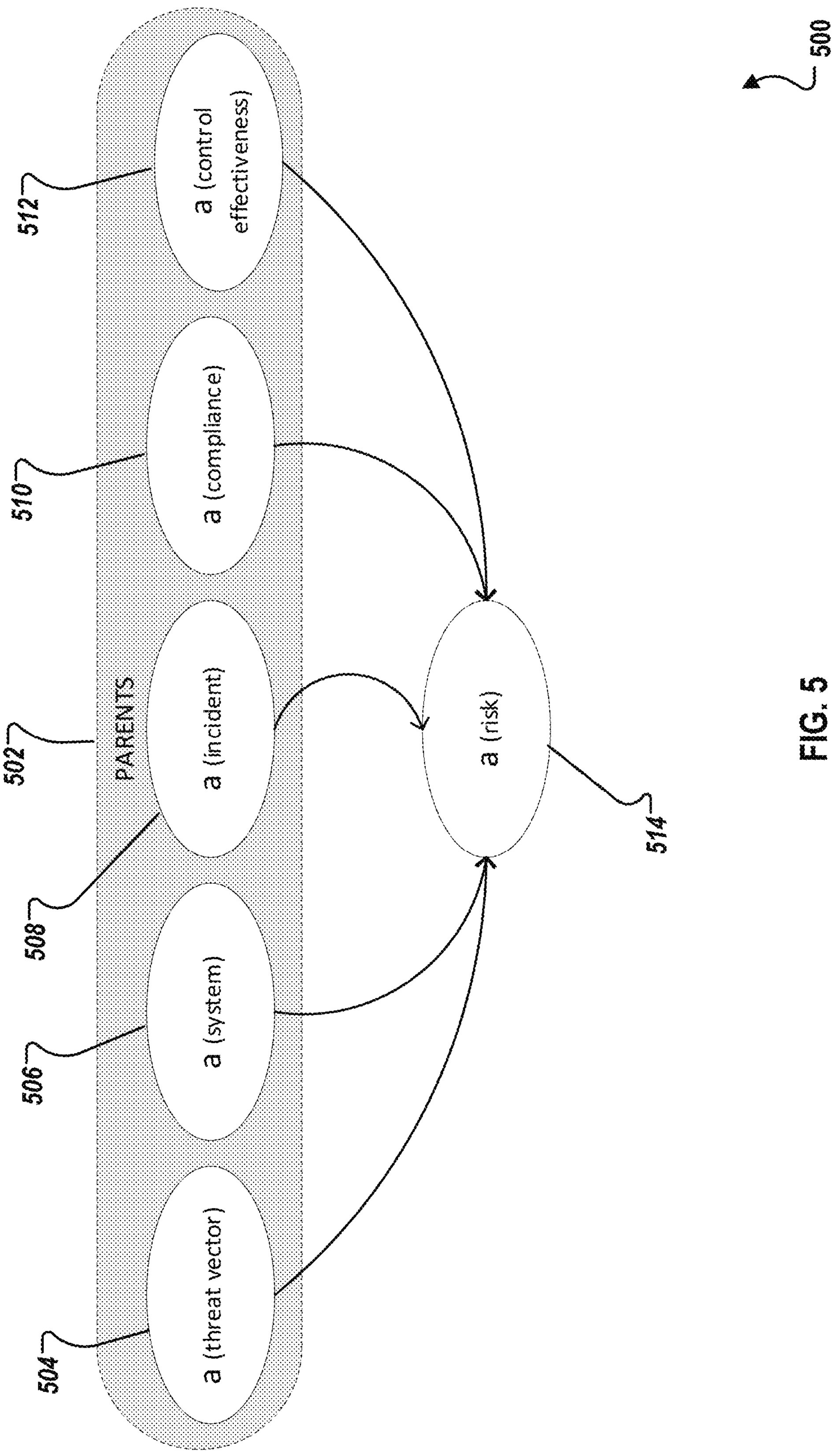
FIG. 5 illustrates an example directed acyclic graph, according to an implementation of the present disclosure.

Turning to FIG. 5, FIG. 5 illustrates an example DAG 500, according to an implementation of the present disclosure. As illustrated in FIG. 5, parent vertices 502 include attributes (a) threat vector 504, system 506, incident 508, compliance 510, and control effectiveness 512. Each parent vertex has an edge/arc directed toward the risk vertex 514. The attributes 504-512 make up a risk 514.

Returning to FIG. 3, using DAG (e.g., as in FIG. 5) the Bayesian equation can be simplified as:

$$\begin{aligned} P\text{ (risk)} &= P \\ &\text{(threat vector, system, incident, compliance, control, effectiveness)} = \\ &P\text{ (threat vector) } P\text{ (system) } P\text{ (incident)} \\ &P\text{ (compliance) } P\text{ (control effectiveness) } P \\ &\text{(risk | threat vector, system, incident, compliance, control effectiveness).} \end{aligned} \tag{3}$$

Laplace Smoothing.

A situation could occur where the described approach is presented with a data value(s) that have not been trained with. Per the Bayesian equation, the posterior probability (306) will incorrectly become zero for that data value. As an example, suppose a system called Compressor Control System (CCS) is presented to the approach that was trained with systems in System(S) dataset, then the probability of CCS is zero (0) because the approach was not trained with CCS.

In this case, the Bayesian equation can be restated using Laplace smoothing as:

$$P(V,S,I,C,E|c)=(n_c+1)/(n+c). \tag{4}$$

The restated equation calculates P(B|A) in equation (1) when evidence c falls in class (V, S, I, C, E), and read is as probability of (V, S, I, C, E) given category c. The variable $n_c$ is a number of times a combination of evidence or variables appears in the category. The variable n is the total number of combinations in a category. The variable c is number of categories. And the last variable is 1, which is a Laplace smoothing factor.

Prior probability for the node whose value the network is attempting to predict P (A) in equation (1), in this case risk severity, can be calculated as:

$$P(c)=n_c/n_n, \tag{5}$$

where $n_n$ is the total number of observations in the dataset D.

The Laplace smoothing equation eliminates a need to calculate P(B) in equation (1), as it is handled as part of smoothing and built in. So, the Bayesian probability equation using the described risk terminologies becomes:

$$P(c \mid V, S, I, C, E) = P(c) * P(V, S, I, C, E \mid c). \tag{6}$$

Applying the Bayesian ML Inference in the appliance (e.g., FIG. 2):

Step 1: Calculate Priori (302).

Assume that the following entries exist in dataset D, risk register:

$$D = X_n = \{a_1, a_2, \ldots, a_n\} = \{V, S, I, C, E, R\},$$

where V={$v_1$, . . . , $v_n$}

$v_1$={Destructive Malware, Nation State, Malicious, External, Unprivileged, adept, High}

$v_2$={Non-authorized code execution, Employee, Accidental, Internal, Significant Privilege, operational, Medium}

$v_3$={Network DoS, Hacker, Malicious, External, Unprivileged, adept, Medium} and $$X_1 = \{v_1, ESD, Y, Y, Y, H\}$$

$$X_2 = \{v_2, DCS, Y, Y, Y, M\}$$

$$X_3 = \{v_2, DCS, Y, Y, Y, M\}$$

$$X_4 = \{v_2, DCS, N, Y, Y, M\}$$

$$X_5 = \{v_2, TCS, N, N, Y, H\}$$

$$X_6 = \{v_2, TCS, N, N, Y, H\}$$

$$X_7 = \{v_1, ESD, N, N, Y, L\}.$$

Applying equation (5), a table, Table 1, can be built to calculate a prior probability of each risk category:

TABLE 1

| Category | Prior Probability |
|---|---|
| High P (high) | 3/7 = 0.43 |
| Medium P (medium) | 3/7 = 0.43 |
| Low P (low) | 1/7 = 0.14 |

There are three prediction categories (c) (i.e., risk categories of high, medium, low). The probability of each of these categories is calculated (P(c)=$n_c/n_n$) appearing based on our evidence (dataset from risk register). There are total of seven (7) entries in the dataset. High and Medium category appears 3 times with a P (high) and P (medium)=3/7=0.43. Low category appears 1 time with a P (low)=1/7=0.14.

Step 2: New Event Occurs: Threat Reported (304).

Applying equation (4), a table, Table 2, can be built to calculate a prior likelihood that a combination of attributes appears in a category and a likelihood that it does not appear in the category:

TABLE 2

| Risk Severity | Threat Vector | System | Incident | Compliance | Control effectiveness | Count | Likelihood | Likelihood Not-Appearing |
|---|---|---|---|---|---|---|---|---|
| High | $v_1$ | ESD | Y | Y | Y | 1 | (1 + 1)/ (3 + 3) = 0.33 | (0 + 1)/ (3 + 3) = 0.17 |
| High | $v_2$ | TCS | N | N | Y | 2 | (2 + 1)/ (3 + 3) = 0.5 | |
| Medium | $v_2$ | DCS | Y | Y | Y | 2 | (2 + 1)/ (3 + 3) = 0.5 | 0 + 1)/ (3 + 3) = 0.17 |
| Medium | $v_2$ | DCS | N | Y | Y | 1 | (1 + 1)/ (3 + 3) = 0.33 | |
| Low | $v_1$ | ESD | N | N | Y | 1 | (1 + 1)/ (1 + 3) = 0.5 | 0 + 1)/ (1 + 3) = 0.25 |

Probability of the evidence is calculated using the Laplace smoothing equation (see equation 4):

$$P(X \mid \Theta) = (n_c + 1) / (n + c).$$

A table (Table 2) is built to identify a unique dataset for each risk category. Observe that from the seven (7) entries, two (2) unique combination for risk category High were found. Of the two unique combinations, one data combination shows up only once, while the other shows up twice. The rest of the table is built for other risk categories.

Applying the Laplace smoothing equation to the first record in the table:

$n_c$=1 as there is only one (1) occurrence of this combination for risk category High (as shown in count column).

n=3 as there are three (3) total data occurrences for risk category High (add the count columns for risk category High).

c=3 as there are 3 categories of prediction i.e. High, Medium, & Low.

A 33% probability of this combination of data in the dataset resulting in a risk category of High.

The calculation is called Priori as a probability prior to new evidence presenting itself. This probability is based on an existing dataset.

A likelihood of not-appearing for the reason stated in the Laplace smoothing section is calculated by reusing the same Laplace smoothing equation. As explained in the Laplace section, the likelihood that a combination of data presented was never seen by the inference engine is calculated. In other words, the presented data combination is new and does not exist in the risk register (data). Applying the Laplace smoothing equation to the first record in the table:

$n_c$=0 as there are no occurrences of the presented combination in the risk category High.

n=3 as there are three (3) total data occurrences for risk category High (add the count columns for risk category High).

c=3 as there are 3 categories of prediction i.e. High, Medium, & Low.

There is a 17% probability that a new never seen data could result in risk category High.

Step 3: Calculate Posterior Probability (306).

The Bayesian inference engine is considered to be trained when P(C) and P(c|V, S, I, C, E) are computed as shown in Table (2). When a new observation is presented to the engine, the posterior probabilities are calculated using equation (6) as shown in Table 3. A category with highest probability is picked as a most likely risk category.

As an example, assume that the following new evidence is presented:

$$X_8 = \{v_1, VMS, N, N, Y, ?\}$$

TABLE 3

| Category | Posterior Probability |
|---|---|
| P(high\| $v_1$, VMS, N, N, Y) | P(high) * P($v_1$, VMS, N, N, Y\|high) = 0.43 * 0.17 = .07 |
| P(medium\| $v_1$, VMS, N, N, Y) | P(medium) * P($v_1$, VMS, N, N, Y\|medium) = 0.43 * 0.17 = .07 |
| P(low\| $v_1$, VMS, N, N, Y) | P(low) * P($v_1$, VMS, N, N, Y\|low) = 0.14 * 0.25 = .04 |

Given the observation in $X_8$, there is a need to calculate the probability that this observation belongs to one of the three categories. Applying the above to the first calculation in the above table: 1) P(high)=0.43 from the prior category probability and 2) P($v_1$, VMS, N, N, Y|high)=0.17, because the combination of attributes in the new data does not appear in the risk register, the "likelihood of not-appearing" for risk category High is used. It can be seen that, based on prior probability, that the new data can be categorized as either High or Medium, as they both have a 7% probability. It becomes obvious that the prior probabilities have a significant impact on the prediction. As the prior data gets larger, the prior probabilities get more accurate and predictions get better.

Figure 6:
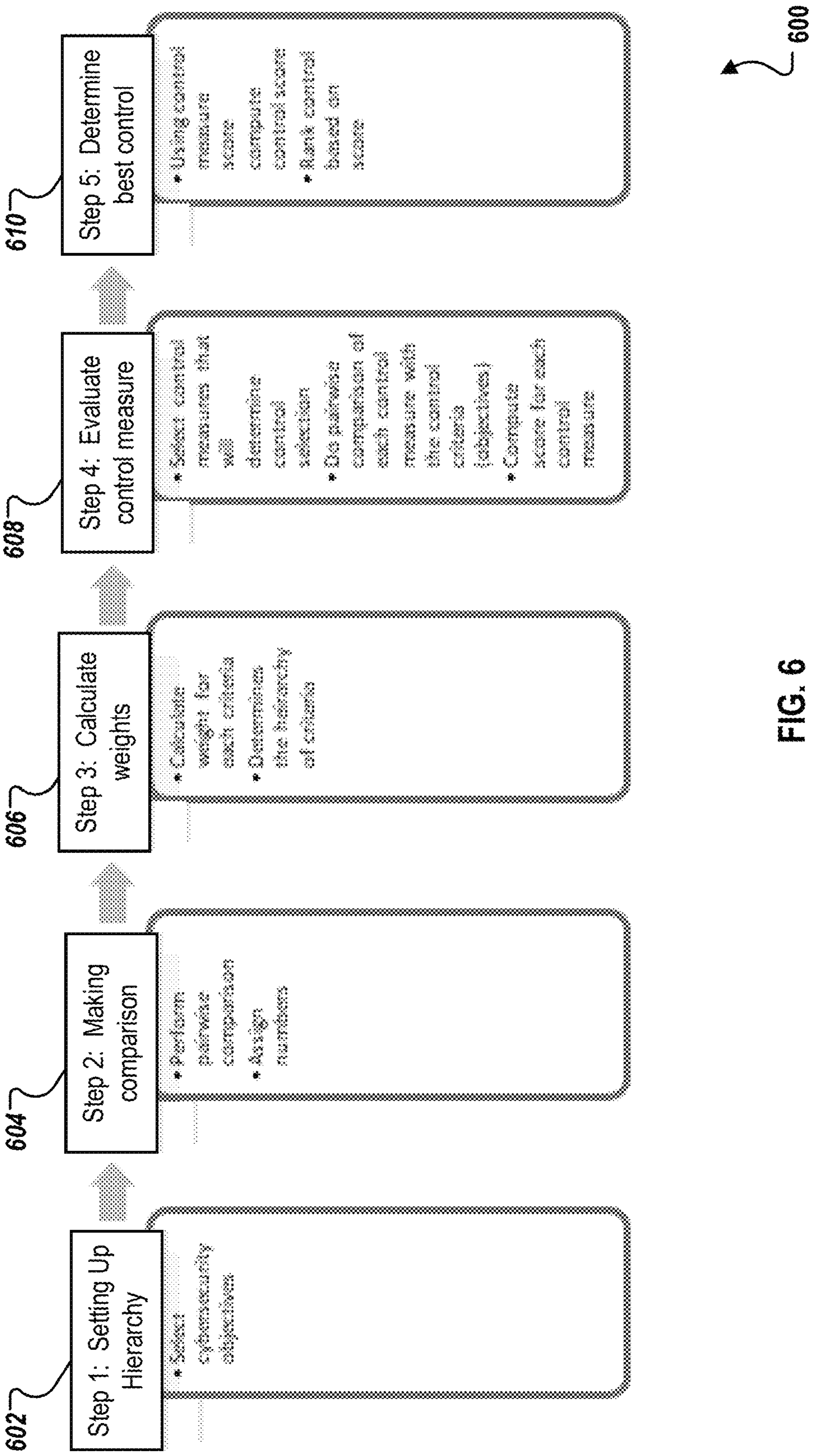
FIG. 6 is a block diagram illustrating an example of an AHP, according to an implementation of the present disclosure.

FIG. 6 is a block diagram illustrating an example of an AHP 600, according to an implementation of the present disclosure. As illustrated in FIG. 6, AHP 600 performed by the AHP engine (e.g., 214 in FIG. 2) includes: 1) Setting up hierarchy 602 (e.g., a) select cybersecurity objectives); 2) Making comparison 604 (e.g., a) perform pairwise comparison and b) assign numbers); 3) Calculate weights 606 (*a*) calculate weight for each criteria and b) determines the hierarchy of criteria); 4) Evaluate control measure 608 (*a*) select control measures that will determine control selection; b) do pairwise comparison of each control measure with the control criteria (objectives); and 5) Determine best control 610 (e.g., a) using control measure score, compute control score and b) rank control based on score).

The AHP 600 methodology includes:

Step 1: Setting Up Hierarchy (602).

Determine main cybersecurity criteria (objectives) to consider, such as "vulnerability to attacks," "ease of implementation," and "impact on operations." Generally, the selected items track directly to the organization's cybersecurity objectives. The system is trying to select controls that optimize the cybersecurity objective realization.

Step 2: Making comparison (604).

Perform a pairwise comparison to determine relative importance. For instance, is "vulnerability to attacks" more important than "ease of implementation." Assign numbers that represent the relative importance of each criterion. This exercise can be conducted with all experts individually and a consensus comparison estimate is derived. In some implementations, an automated computer process(es) can be used to determine the relative importance of each criterion.

Step 3: Calculate weights (606).

Using the comparison numbers, AHP 600 calculates weights for each criterion. The weights setup the hierarchy of criteria in the order of importance based on expert consensus. If "vulnerability to attacks" is more important than "ease of implementation," it receives a higher weight.

Step 4: Evaluate Control Measure (608).

Select control measures (controls) to enhance operational technology (OT) cybersecurity, such as "implementing network segmentation," "regular patching," and "intrusion detection systems." Evaluate how well each control measure meets the criteria defined in the previous step using pairwise comparison.

Step 5: Determine Best Control (610).

Using these comparison values, AHP 600 calculates scores for each control measure. The scores help rank the control measures based on how well they align with the criteria. The control measure with the highest score is considered the most suitable choice. As an example, suppose a comparison is performed with "network segmentation," "regular patching," and "intrusion detection systems." AHP 600 computes scores based on pairwise comparisons and suggests that "network segmentation" is the best choice, because it effectively reduces vulnerability to attacks and has a reasonable impact on operations.

Sample Hierarchy Criterion.

When performing an AHP 600 to determine OT cybersecurity control effectiveness, it is important to consider a comprehensive set of criteria. For example, some recommended most relevant criteria based on guidance provided by the "ISA/IEC 62443-Security for industrial automation and control systems," "NIST SP 800-82: Guide to Industrial Control Systems (ICS) Security," and ISO 27001, include:

1. Threat Impact and Severity: Evaluate the potential impact of cyber threats on the industrial control system (ICS) components, considering criticality and consequences.
2. Risk Assessment and Management: Consider how well the cybersecurity control mitigates identified risks to the ICS. This involves aligning with the risk management strategy and procedures.

3. System Resilience: Evaluate how the cybersecurity control enhances the system's resilience against disruptions, minimizing downtime and promoting rapid recovery.
4. Integration with ICS Operations: Consider how seamlessly the control integrates with the operational aspects of the ICS without causing disruptions.
5. Compliance with Standards and Regulations: Evaluate whether the cybersecurity control aligns with relevant standards and regulations, ensuring a robust security posture.
6. Usability and User Training: Consider the ease of use of the control and the adequacy of user training programs to ensure effective implementation.
7. Response to Emerging Threats: Assess the control's ability to adapt and evolve to counter new and emerging cyber threats effectively.
8. Sustainability and Maintenance: Examine the control's long-term sustainability, including maintenance requirements and ongoing support.

The following is a particular example, for illustration only, of a use of AHP 600 to assist with understanding.

Step 1: Setting Up the Hierarchy (602).

The following criteria were selected from an entity's cybersecurity objectives:

a. Impact (consequence)
b. System resilience (minimize downtime)
c. Compliance with standards and Regulation.

Step 2: Making Comparisons (604)

Pairwise comparisons are conducted to determine a relative importance of criteria. In the case where experts are used, this task relies on individual expert's experience. Each expert rates the importance and a final consensus is used to quantify the priority. The importance is rated on a scale of 1-9, where 1 indicates equal importance and 9 indicates extremely more important.

Table 4 illustrates consensus the experts reached on the importance between two criteria.

TABLE 4

| Criteria | Impact | System Resilience | Compliance |
|---|---|---|---|
| Impact | 1 | 1/6 | 7 |
| System Resilience | 6 | 1 | 8 |
| Compliance | 1/7 | 1/8 | 1 |

For example, the experts agreed that impact is moderately more important than compliance (7) while system resilience is significantly more important than compliance (8). Note: a fraction denotes a reverse relationship.

Step 3: Calculating Weights (606)

Weights are calculated for each criterion, reflecting their significance in the decision-making process. For this we first normalize the pairwise comparison in Table 4 built from expert consensus to develop the normalized table in Table 5:

TABLE 5

| Criteria | Impact | System Resilience | Compliance |
|---|---|---|---|
| Impact | 6/49 | 1/49 | 42/49 |
| System Resilience | 6/15 | 1/15 | 8/15 |
| Compliance | 8/71 | 7/71 | 56/71 |

Note: to normalize, sum each row and divide each element of the row by its sum. The sum of the normalized row will result in 1.

An eigenvector for Table 3 is calculated to derive the weights.

1. Obtain the average score for each column.

$$\text{Impact} = (6/49 + 6/15 + 8/71)/3 = .553. \quad \text{i.}$$

$$\text{System Resilience} = (1/49 + 1/15 + 7/71)/3 = .062. \quad \text{ii.}$$

$$\text{Compliance} = (42/49 + 8/15 + 56/71)/3 = .726. \quad \text{iii.}$$

2. Using the average scores, the eigenvector is normalized for each importance criteria to obtain final calculated weights as shown in Table 6. The values are used in the next steps to evaluate effectiveness of the controls.
   iv. Compute the average of importance criteria from above=(0.553+0.062+0.726)/3=0.857.
   v. Divide each importance eigenvector with the average to normalize the values.

TABLE 6

| | Impact | System Resilience | Compliance |
|---|---|---|---|
| Normalized Eigenvector | .553/.857 = 645 | .062/.857 = .072 | .726/.857 = .847 |

Step 4: Evaluate Control Measure (608)

Evaluate the available control measures—network segmentation, regular patching, and intrusion detection systems—against each criterion (objective). Assess how well each control mitigates the risk. To evaluate the control measure, execute:

After evaluating the control options by each individual expert against each criterion and assigning scores 1-9 indicating the relative performance of each measure for each control, a consensus between experts is achieved and recorded as shown in Table 7.

TABLE 7

| Control | Impact | System Resilience | Compliance |
|---|---|---|---|
| Network Segmentation | 7 | 3 | 6 |
| Regular Patching | 5 | 3 | 7 |
| Intrusion Detection | 3 | 5 | 6 |

For example, the expert consensus is that network segmentation is moderately effective in reducing Impact (7) while Intrusion detection is least effective in reducing impact (3).

The weighted average of the consensus is calculated by multiplying each element in the control evaluation matrix (Table 7) by the corresponding weight for each criterion (Table 3) and, as shown in Table 6, sum up the weighted scores for each control:

TABLE 8

| Controls | Weighted Score |
|---|---|
| Network Segmentation | 7*.645 + 3*.072 + 6*.847 = 9.813 |
| Regular Patching | 5*.645 + 3*.072 + 7*.847 = 9.37 |
| Intrusion Detection | 3*.645 + 5*.072 + 6*.847 = 7.377 |

Note: in some implementations, Table 8 can be pre-calculated and stored in the control catalog for each control measure. The appliance will then automatically rank controls based on this score for the selected list of controls.

Appliance in action:

1. Threat intel report is analyzed and a new threat is discovered.
2. Bayesian input is created to determine risk for a specific asset.
3. Bayesian engine determines the risk and severity and decision to mitigate is made.
4. Using control catalog appropriate controls are identified that can mitigate these risks.
5. Selected controls are ranked based on AHP score and recommendation list generated.
6. Appliance can be integrated with a ticketing system that automatically creates a work order to implement a control.

Control Catalog.

In some implementations, a custom Control Catalog can resemble Table 9:

TABLE 9

| Control Measure | Impact | System Resilience | Compliance | Malware | Un-authorized access | Supply chain |
|---|---|---|---|---|---|---|
| Network Segment | 7 | 3 | 6 | 1 | 0 | 1 |
| Patch Management | 3 | 7 | 5 | 0 | 1 | 0 |
| Backup & Recovery | 8 | 6 | 3 | 0 | 0 | 1 |
| Authentication | 4 | 5 | 4 | 1 | 1 | 1 |
| . . . | | | | | | |

The idea is to take a universe of controls and map it to relevant attributes. In this example, controls have been mapped to criteria derived from AHP and additionally, it has been mapped to threat events that these controls mitigate. For example, if the new threat is shown to use malware, then the appliance will automatically pick network segmentation, and Authentication and apply AHP multipliers to the control measure score.

In some implementations, the Control Catalog can be enriched. Example, enrichments can include 1) individual mapping of a threat event control, enabling automatic selection of relevant controls as soon as a threat event is detected and 2) individual mapping of a cybersecurity attributes control using a pairwise comparison, enabling implementation of AHP.

Technically/theoretically these two can be combined to any application where a prediction is required and consequently a decision has to be made. However, the combination of this in the space of risk is not obvious because the Bayesian algorithm/AHP combination relies on a specific design of the Control Catalog. The Control Catalog must be designed to: 1) map controls to threat events and 2) the control catalog has to be enriched to add AHP related pair wise comparisons.

Subsequently, the AHP engine (e.g., 214 in FIG. 2) performs the following calculation as shown in Table 10:

TABLE 10

| Controls | Weighted Score |
|---|---|
| Network Segmentation | 7*.645 + 3*.072 + 6*.847 = 9.813 |
| Authentication | 4*.645 + 5*.072 + 4*.847 = 6.328 |

Step 5: Determine Best Control (610).

A best control to is determined to mitigate malware while optimizing the established cybersecurity criteria/objectives is to implement network segmentation and a second preference is implementing authentication.

In some implementations, the described approach can perform an automated configuration of a cybersecurity control. Given the previously described risk severity, an automated system to change a configuration of an already implemented control is feasible to set a security level given a threat level. The automated system can tighten a configuration so that the control can work at a required security level.

Figure 7:
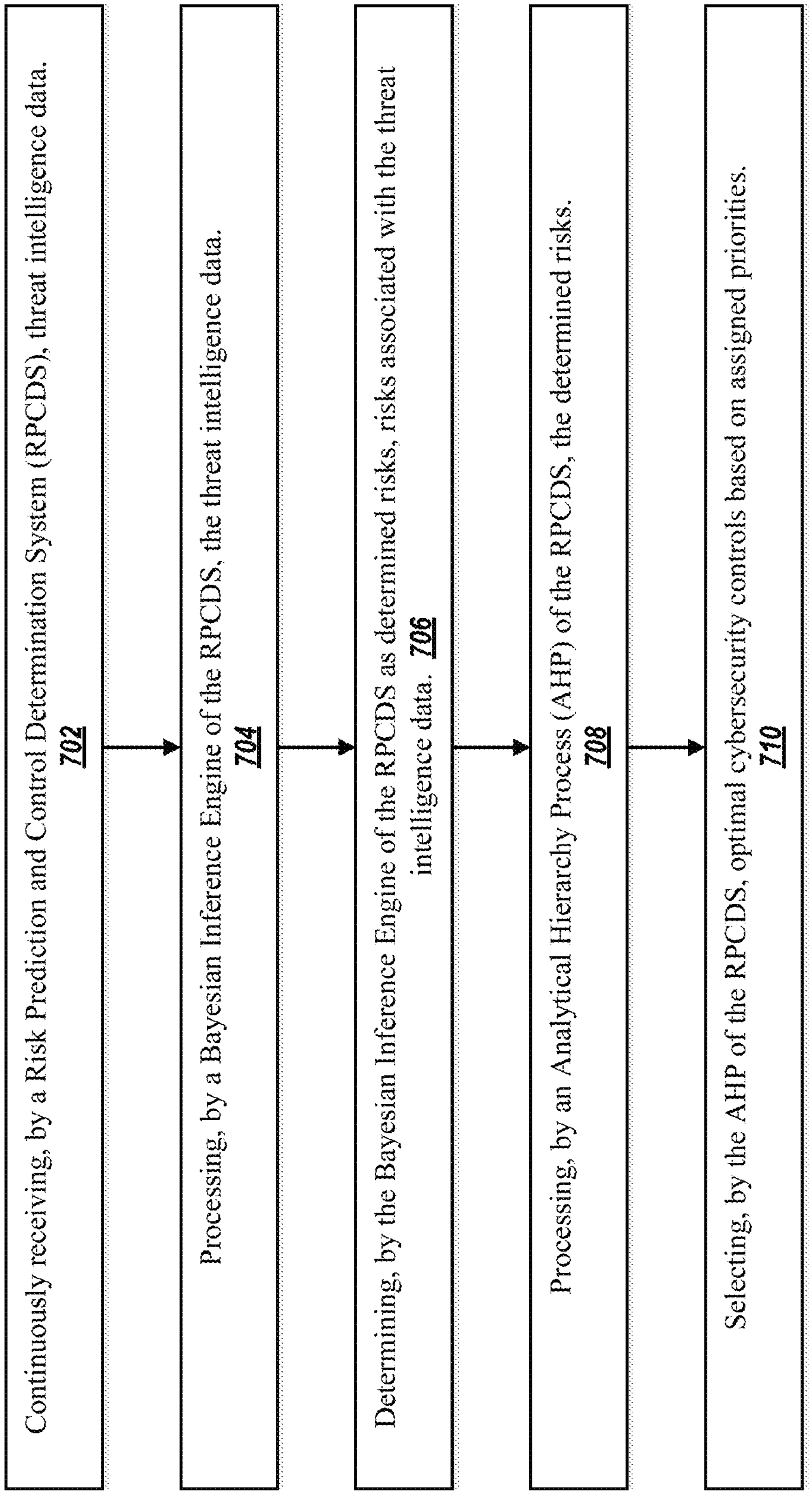
FIG. 7 is a flowchart illustrating an example of a computer-implemented method for dynamic prediction of operations technology cybersecurity risk and determination of optimal mitigating control using Bayesian-inference-based machine learning (ML) and analytical hierarchy process, according to an implementation of the present disclosure.

FIG. 7 is a flowchart illustrating an example of a computer-implemented method 700 for dynamic prediction of operations technology cybersecurity risk and determination of optimal mitigating control using Bayesian-inference-based machine learning and analytical hierarchy process, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, threat intelligence data is received by a Risk Prediction and Control Determination System (RPCDS). From 702, method 700 proceeds to 704.

At 704, the threat intelligence data is processed using a Bayesian Inference Engine of the RPCDS. In some implementations, the Bayesian Inference Engine accesses a Risk Register and Bayesian Probability for risk and probability data, respectively, associated with the threat intelligence data. From 704, method 700 proceeds to 706.

At 706, risks associated with the threat intelligence data are determined, as determined risks, by the Bayesian Inference Engine of the RPCDS. In some implementations, the Bayesian Inference Engine updates and refines predictions on potential cybersecurity risks and associated severity of the potential cybersecurity risks. From 706, method 700 proceeds to 708.

At 708, the determined risk is processed by an Analytical Hierarchy Process (AHP) of the RPCDS. In some implementations, the AHP of the RPCDS assigns, as the assigned priorities, priority values to cybersecurity attributes based on significance in context of defined cybersecurity goals. In some implementations, the AHP of the RPCDS uses AHP Criteria and a Control Catalog to assign the priority values to the cybersecurity attributes. In some implementations, a threat is detected by the RPCDS as a detected thread and an automated response to the detected threat is triggered by the RPCDS. From 708, method 700 proceeds to 710.

At 710, optimal cybersecurity controls are selected by the AHP of the RPCDS based on assigned priorities. In some implementations, the AHP of the RPCDS uses a decision-making matrix to select the optimal cybersecurity controls. After 710, method 700 can stop.

Figure 8:
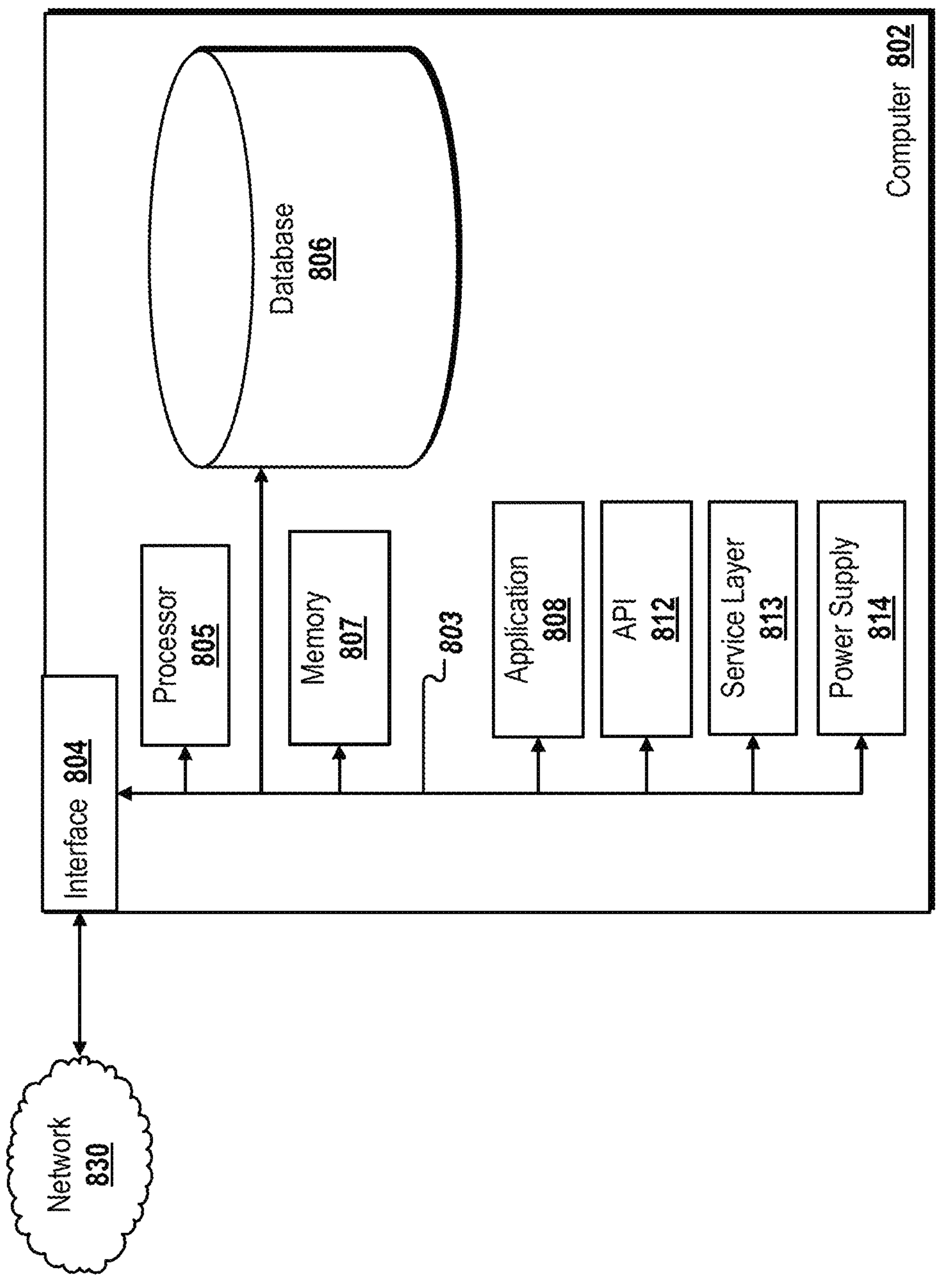
FIG. 8 is a block diagram illustrating an example of a computer-implemented system used to provide computational functionalities associated with described algorithms, methods, functions, processes, flows, and procedures, according to an implementation of the present disclosure.

FIG. 8 is a block diagram illustrating an example of a computer-implemented System 800 used to provide computational functionalities associated with described algorithms, methods, functions, processes, flows, and procedures, according to an implementation of the present disclosure. In the illustrated implementation, computer-implemented system 800 includes a Computer 802 and a Network 830.

The illustrated Computer 802 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 802 can include an input device, such as a keypad, keyboard, or touch screen, or a combination of input devices that can accept user information, and an output device that conveys information associated with the operation of the Computer 802, including digital data, visual, audio, another type of information, or a combination of types of information, on a graphical-type user interface (UI) (or GUI) or other UI.

The Computer 802 can serve in a role in a distributed computing system as, for example, a client, network component, a server, or a database or another persistency, or a combination of roles for performing the subject matter described in the present disclosure. The illustrated Computer 802 is communicably coupled with a Network 830. In some implementations, one or more components of the Computer 802 can be configured to operate within an environment, or a combination of environments, including cloud-computing, local, or global.

At a high level, the Computer 802 is an electronic computing device operable to receive, transmit, process, store, or manage data and information associated with the described subject matter. According to some implementations, the Computer 802 can also include or be communicably coupled with a server, such as an application server, e-mail server, web server, caching server, or streaming data server, or a combination of servers.

The Computer 802 can receive requests over Network 830 (for example, from a client software application executing on another Computer 802) and respond to the received requests by processing the received requests using a software application or a combination of software applications. In addition, requests can also be sent to the Computer 802 from internal users (for example, from a command console or by another internal access method), external or third-parties, or other entities, individuals, systems, or computers.

Each of the components of the Computer 802 can communicate using a System Bus 803. In some implementations, any or all of the components of the Computer 802, including hardware, software, or a combination of hardware and software, can interface over the System Bus 803 using an application programming interface (API) 812, a Service Layer 813, or a combination of the API 812 and Service Layer 813. The API 812 can include specifications for routines, data structures, and object classes. The API 812 can be either computer-language independent or dependent and refer to a complete interface, a single function, or even a set of APIs. The Service Layer 813 provides software services to the Computer 802 or other components (whether illustrated or not) that are communicably coupled to the Computer 802. The functionality of the Computer 802 can be accessible for all service consumers using the Service Layer 813. Software services, such as those provided by the Service Layer 813, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 802, alternative implementations can illustrate the API 812 or the Service Layer 813 as stand-alone components in relation to other components of the Computer 802 or other components (whether illustrated or not) that are communicably coupled to the Computer 802. Moreover, any or all parts of the API 812 or the Service Layer 813 can be implemented as a child or a sub-module of another software module, enterprise application, or hardware module without departing from the scope of the present disclosure.

The Computer 802 includes an Interface 804. Although illustrated as a single Interface 804, two or more Interfaces 804 can be used according to particular needs, desires, or particular implementations of the Computer 802. The Interface 804 is used by the Computer 802 for communicating with another computing system (whether illustrated or not) that is communicatively linked to the Network 830 in a distributed environment. Generally, the Interface 804 is operable to communicate with the Network 830 and includes logic encoded in software, hardware, or a combination of software and hardware. More specifically, the Interface 804 can include software supporting one or more communication protocols associated with communications such that the Network 830 or hardware of Interface 804 is operable to communicate physical signals within and outside of the illustrated Computer 802.

The Computer 802 includes a Processor 805. Although illustrated as a single Processor 805, two or more Processors 805 can be used according to particular needs, desires, or particular implementations of the Computer 802. Generally, the Processor 805 executes instructions and manipulates data to perform the operations of the Computer 802 and any algorithms, methods, functions, processes, flows, and procedures as described in the present disclosure.

The Computer 802 also includes a Database 806 that can hold data for the Computer 802, another component communicatively linked to the Network 830 (whether illustrated or not), or a combination of the Computer 802 and another component. For example, Database 806 can be an in-memory or conventional database storing data consistent with the present disclosure. In some implementations, Database 806 can be a combination of two or more different database types (for example, a hybrid in-memory and conventional database) according to particular needs, desires, or particular implementations of the Computer 802 and the described functionality. Although illustrated as a single Database 806, two or more databases of similar or differing types can be used according to particular needs, desires, or particular implementations of the Computer 802 and the described functionality. While Database 806 is illustrated as an integral component of the Computer 802, in alternative implementations, Database 806 can be external to the Computer 802. The Database 806 can hold and operate on at least any data type mentioned or any data type consistent with this disclosure.

The Computer 802 also includes a Memory 807 that can hold data for the Computer 802, another component or components communicatively linked to the Network 830 (whether illustrated or not), or a combination of the Computer 802 and another component. Memory 807 can store any data consistent with the present disclosure. In some implementations, Memory 807 can be a combination of two or more different types of memory (for example, a combination of semiconductor and magnetic storage) according to particular needs, desires, or particular implementations of the Computer 802 and the described functionality. Although illustrated as a single Memory 807, two or more Memories 807 or similar or differing types can be used according to particular needs, desires, or particular implementations of the Computer 802 and the described functionality. While Memory 807 is illustrated as an integral component of the Computer 802, in alternative implementations, Memory 807 can be external to the Computer 802.

The Application 808 is an algorithmic software engine providing functionality according to particular needs, desires, or particular implementations of the Computer 802, particularly with respect to functionality described in the present disclosure. For example, Application 808 can serve as one or more components, modules, or applications. Further, although illustrated as a single Application 808, the Application 808 can be implemented as multiple Applications 808 on the Computer 802. In addition, although illustrated as integral to the Computer 802, in alternative implementations, the Application 808 can be external to the Computer 802.

The Computer 802 can also include a Power Supply 814. The Power Supply 814 can include a rechargeable or non-rechargeable battery that can be configured to be either user- or non-user-replaceable. In some implementations, the Power Supply 814 can include power-conversion or management circuits (including recharging, standby, or another power management functionality). In some implementations, the Power Supply 814 can include a power plug to allow the Computer 802 to be plugged into a wall socket or another power source to, for example, power the Computer 802 or recharge a rechargeable battery.

There can be any number of Computers 802 associated with, or external to, a computer system containing Computer 802, each Computer 802 communicating over Network 830. Further, the term "client," "user," or other appropriate terminology can be used interchangeably, as appropriate, without departing from the scope of the present disclosure. Moreover, the present disclosure contemplates that many users can use one Computer 802, or that one user can use multiple computers 802.

Figure 9:
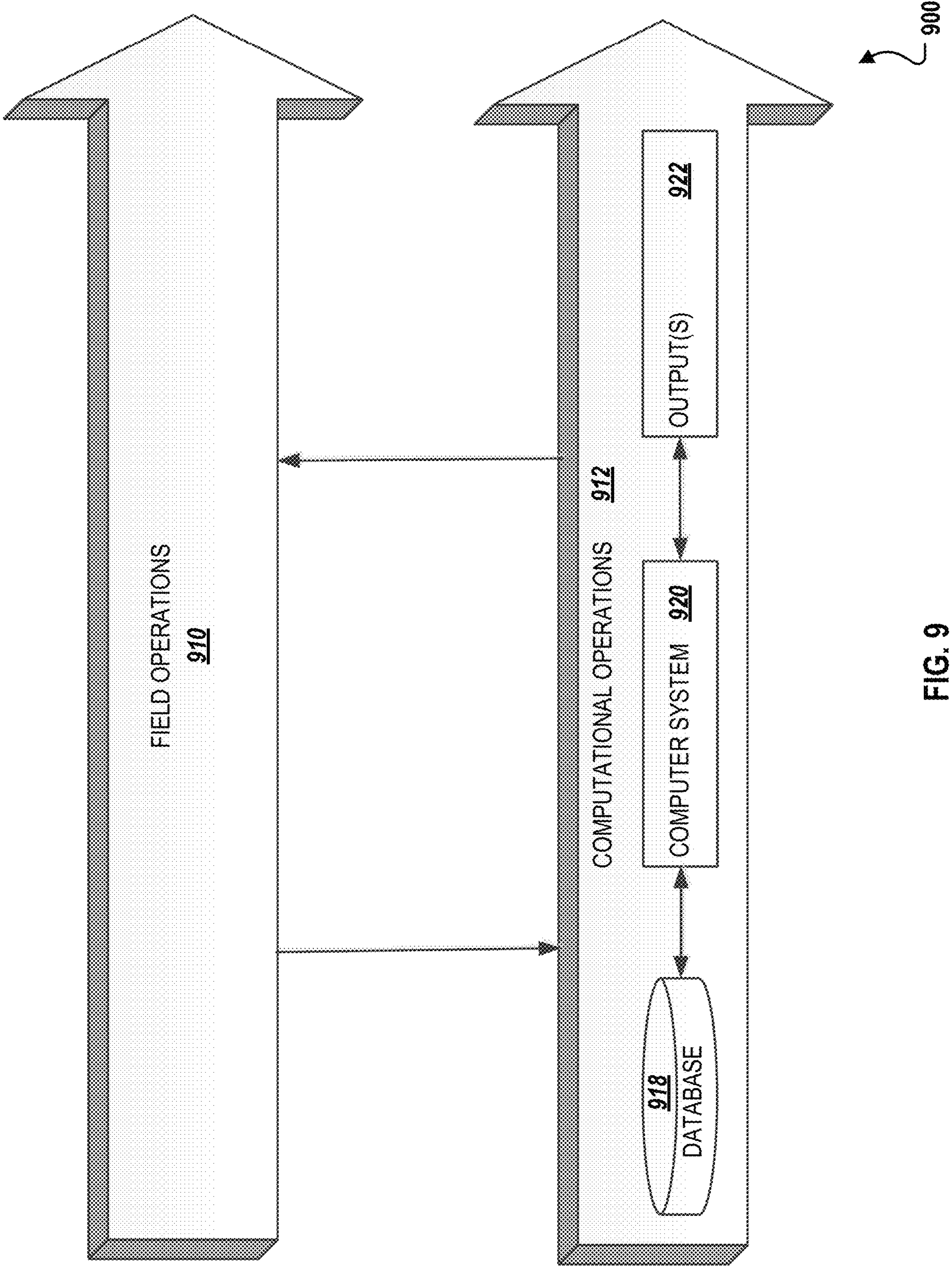
FIG. 9 illustrates hydrocarbon production operations that include both one or more field operations and one or more computational operations, which exchange information and control exploration for the production of hydrocarbons, according to an implementation of the present disclosure.

FIG. 9 illustrates hydrocarbon production operations 900 that include both one or more field operations 910 and one or more computational operations 912, which exchange information and control exploration for the production of hydrocarbons. In some implementations, outputs of techniques of the present disclosure can be performed before, during, or in combination with the hydrocarbon production operations 900, specifically, for example, either as field operations 910 or computational operations 912, or both.

Examples of field operations 910 include forming/drilling a wellbore, hydraulic fracturing, producing through the wellbore, injecting fluids (such as water) through the wellbore, to name a few. In some implementations, methods of the present disclosure can trigger or control the field operations 910. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 910 and responsively triggering the field operations 910 including, for example, generating plans and signals that provide feedback to and control physical components of the field operations 910. Alternatively, or in addition to, the field operations 910 can trigger the methods of the present disclosure. For example, implementing physical components (including, for example, hardware, such as sensors) deployed in the field operations 910 can generate plans and signals that can be provided as input or feedback (or both) to the methods of the present disclosure.

Examples of computational operations 912 include one or more computer systems 920 that include one or more processors and computer-readable media (e.g., non-transitory computer-readable media) operatively coupled to the one or more processors to execute computer operations to perform the methods of the present disclosure. The computational operations 912 can be implemented using one or more databases 918, which store data received from the field operations 910 and/or generated internally within the computational operations 912 (e.g., by implementing the methods of the present disclosure) or both. For example, the one or more computer systems 920 process inputs from the field operations 910 to assess conditions in the physical world, the outputs of which are stored in the databases 918. For example, seismic sensors of the field operations 910 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 912 where they are stored in the databases 918 and analyzed by the one or more computer systems 920.

In some implementations, one or more outputs 922 generated by the one or more computer systems 920 can be provided as feedback/input to the field operations 910 (either as direct input or stored in the databases 918). The field operations 910 can use the feedback/input to control physical components used to perform the field operations 910 in the real world.

For example, the computational operations 912 can process the seismic data to generate three-dimensional (3D) maps of the subsurface formation. The computational operations 912 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 912 to process new information about the formation and control the drilling to adjust to the observed conditions in real-time.

The one or more computer systems 920 can update the 3D maps of the subsurface formation as information from one exploration well is received and the computational operations 912 can adjust the location of the next exploration well based on the updated 3D maps. Similarly, the data received from production operations can be used by the computational operations 912 to control components of the production operations. For example, production well and pipeline data can be analyzed to predict slugging in pipelines leading to a refinery and the computational operations 912 can control machine operated valves upstream of the refinery to reduce the likelihood of plant disruptions that run the risk of taking the plant offline.

In some implementations of the computational operations 912, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Described implementations of the subject matter can include one or more features, alone or in combination.

For example, in a first implementation, a computer-implemented method, comprising: continuously receiving, by a Risk Prediction and Control Determination System (RPCDS), threat intelligence data; processing, by a Bayesian Inference Engine of the RPCDS, the threat intelligence data; determining, by the Bayesian Inference Engine of the RPCDS as determined risks, risks associated with the threat intelligence data; processing, by an Analytical Hierarchy Process (AHP) of the RPCDS, the determined risks; and selecting, by the AHP of the RPCDS, optimal cybersecurity controls based on assigned priorities.

The foregoing and other described implementations can each, optionally, include one or more of the following features:

A first feature, combinable with any of the following features, wherein the Bayesian Inference Engine accesses a Risk Register and Bayesian Probability for risk and probability data, respectively, associated with the threat intelligence data.

A second feature, combinable with any of the previous or following features, wherein the Bayesian Inference Engine updates and refines predictions on potential cybersecurity risks and associated severity of the potential cybersecurity risks.

A third feature, combinable with any of the previous or following features, wherein the AHP of the RPCDS assigns, as the assigned priorities, priority values to cybersecurity attributes based on significance in context of defined cybersecurity goals.

A fourth feature, combinable with any of the previous or following features, wherein the AHP of the RPCDS uses AHP Criteria and a Control Catalog to assign the priority values to the cybersecurity attributes.

A fifth feature, combinable with any of the previous or following features, comprising: detecting, by the RPCDS and as a detected threat, a threat; and triggering, by the RPCDS, an automated response to the detected threat.

A sixth feature, combinable with any of the previous or following features, wherein the AHP of the RPCDS uses a decision-making matrix to select the optimal cybersecurity controls.

In a second implementation, a non-transitory, computer-readable medium storing one or more instructions executable by a computer system to perform one or more operations, comprising: continuously receiving, by a Risk Prediction and Control Determination System (RPCDS), threat intelligence data; processing, by a Bayesian Inference Engine of the RPCDS, the threat intelligence data; determining, by the Bayesian Inference Engine of the RPCDS as determined risks, risks associated with the threat intelligence data; processing, by an Analytical Hierarchy Process (AHP) of the RPCDS, the determined risks; and selecting, by the AHP of the RPCDS, optimal cybersecurity controls based on assigned priorities.

The foregoing and other described implementations can each, optionally, include one or more of the following features:

A first feature, combinable with any of the following features, wherein the Bayesian Inference Engine accesses a Risk Register and Bayesian Probability for risk and probability data, respectively, associated with the threat intelligence data.

A second feature, combinable with any of the previous or following features, wherein the Bayesian Inference Engine updates and refines predictions on potential cybersecurity risks and associated severity of the potential cybersecurity risks.

A third feature, combinable with any of the previous or following features, wherein the AHP of the RPCDS assigns, as the assigned priorities, priority values to cybersecurity attributes based on significance in context of defined cybersecurity goals.

A fourth feature, combinable with any of the previous or following features, wherein the AHP of the RPCDS uses AHP Criteria and a Control Catalog to assign the priority values to the cybersecurity attributes.

A fifth feature, combinable with any of the previous or following features, comprising: detecting, by the RPCDS and as a detected threat, a threat; and triggering, by the RPCDS, an automated response to the detected threat.

A sixth feature, combinable with any of the previous or following features, wherein the AHP of the RPCDS uses a decision-making matrix to select the optimal cybersecurity controls.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations, comprising: continuously receiving, by a Risk Prediction and Control Determination System (RPCDS), threat intelligence data; processing, by a Bayesian Inference Engine of the RPCDS, the threat intelligence data; determining, by the Bayesian Inference Engine of the RPCDS as determined risks, risks associated with the threat intelligence data; processing, by an Analytical Hierarchy Process (AHP) of the RPCDS, the determined risks; and selecting, by the AHP of the RPCDS, optimal cybersecurity controls based on assigned priorities.

The foregoing and other described implementations can each, optionally, include one or more of the following features:

A first feature, combinable with any of the following features, wherein the Bayesian Inference Engine accesses a Risk Register and Bayesian Probability for risk and probability data, respectively, associated with the threat intelligence data.

A second feature, combinable with any of the previous or following features, wherein the Bayesian Inference Engine updates and refines predictions on potential cybersecurity risks and associated severity of the potential cybersecurity risks.

A third feature, combinable with any of the previous or following features, wherein the AHP of the RPCDS assigns, as the assigned priorities, priority values to cybersecurity attributes based on significance in context of defined cybersecurity goals.

A fourth feature, combinable with any of the previous or following features, wherein the AHP of the RPCDS uses AHP Criteria and a Control Catalog to assign the priority values to the cybersecurity attributes.

A fifth feature, combinable with any of the previous or following features, comprising: detecting, by the RPCDS and as a detected threat, a threat; and triggering, by the RPCDS, an automated response to the detected threat.

A sixth feature, combinable with any of the previous or following features, wherein the AHP of the RPCDS uses a decision-making matrix to select the optimal cybersecurity controls.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:

continuously receiving, by a Risk Prediction and Control Determination System (RPCDS), threat intelligence data;

processing, by a Bayesian Inference Engine of the RPCDS, the threat intelligence data;

determining, by the Bayesian Inference Engine of the RPCDS as determined risks, risks associated with the threat intelligence data;

processing, by an Analytical Hierarchy Process (AHP) of the RPCDS, the determined risks; and selecting, by the AHP of the RPCDS, optimal cybersecurity controls based on assigned priorities.

2. The computer-implemented method of claim 1, wherein the Bayesian Inference Engine accesses a Risk Register and Bayesian Probability for risk and probability data, respectively, associated with the threat intelligence data.

3. The computer-implemented method of claim 1, wherein the Bayesian Inference Engine updates and refines predictions on potential cybersecurity risks and associated severity of the potential cybersecurity risks.

4. The computer-implemented method of claim 1, wherein the AHP of the RPCDS assigns, as the assigned priorities, priority values to cybersecurity attributes based on significance in context of defined cybersecurity goals.

5. The computer-implemented method of claim 4, wherein the AHP of the RPCDS uses AHP Criteria and a Control Catalog to assign the priority values to the cybersecurity attributes.

6. The computer-implemented method of claim 4, comprising:

detecting, by the RPCDS and as a detected threat, a threat; and triggering, by the RPCDS, an automated response to the detected threat.

7. The computer-implemented method of claim 1, wherein the AHP of the RPCDS uses a decision-making matrix to select the optimal cybersecurity controls.

8. A non-transitory, computer-readable medium storing one or more instructions executable by a computer system to perform one or more operations, comprising:

continuously receiving, by a Risk Prediction and Control Determination System (RPCDS), threat intelligence data;

processing, by a Bayesian Inference Engine of the RPCDS, the threat intelligence data;

determining, by the Bayesian Inference Engine of the RPCDS as determined risks, risks associated with the threat intelligence data;

processing, by an Analytical Hierarchy Process (AHP) of the RPCDS, the determined risks; and selecting, by the AHP of the RPCDS, optimal cybersecurity controls based on assigned priorities.

9. The non-transitory, computer-readable medium of claim 8, wherein the Bayesian Inference Engine accesses a Risk Register and Bayesian Probability for risk and probability data, respectively, associated with the threat intelligence data.

10. The non-transitory, computer-readable medium of claim 8, wherein the Bayesian Inference Engine updates and refines predictions on potential cybersecurity risks and associated severity of the potential cybersecurity risks.

11. The non-transitory, computer-readable medium of claim 8, wherein the AHP of the RPCDS assigns, as the assigned priorities, priority values to cybersecurity attributes based on significance in context of defined cybersecurity goals.

12. The non-transitory, computer-readable medium of claim 11, wherein the AHP of the RPCDS uses AHP Criteria and a Control Catalog to assign the priority values to the cybersecurity attributes.

13. The non-transitory, computer-readable medium of claim 11, comprising:

detecting, by the RPCDS and as a detected threat, a threat; and triggering, by the RPCDS, an automated response to the detected threat.

14. The non-transitory, computer-readable medium of claim 8, wherein the AHP of the RPCDS uses a decision-making matrix to select the optimal cybersecurity controls.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

continuously receiving, by a Risk Prediction and Control Determination System (RPCDS), threat intelligence data;

processing, by a Bayesian Inference Engine of the RPCDS, the threat intelligence data;

determining, by the Bayesian Inference Engine of the RPCDS as determined risks, risks associated with the threat intelligence data;

processing, by an Analytical Hierarchy Process (AHP) of the RPCDS, the determined risks; and selecting, by the AHP of the RPCDS, optimal cybersecurity controls based on assigned priorities.

16. The computer-implemented system of claim 15, wherein the Bayesian Inference Engine accesses a Risk Register and Bayesian Probability for risk and probability data, respectively, associated with the threat intelligence data.

17. The computer-implemented system of claim 15, wherein the Bayesian Inference Engine updates and refines predictions on potential cybersecurity risks and associated severity of the potential cybersecurity risks.

18. The computer-implemented system of claim 15, wherein the AHP of the RPCDS assigns, as the assigned priorities, priority values to cybersecurity attributes based on significance in context of defined cybersecurity goals.

19. The computer-implemented system of claim 18, wherein the AHP of the RPCDS uses AHP Criteria and a Control Catalog to assign the priority values to the cybersecurity attributes.

20. The computer-implemented system of claim 18, comprising:

detecting, by the RPCDS and as a detected threat, a threat; and triggering, by the RPCDS, an automated response to the detected threat.

* * * * *